United States Patent

[11] 3,559,929

[72] Inventor David B. Lindsay, Jr.
 Box 1719, Sarasota, Fla. 33578
[21] Appl. No. 831,962
[22] Filed June 10, 1969
[45] Patented Feb. 2, 1971

[54] ORDNANCE ACTUATION CONTROLS WITHIN THE RANGE OF VISION OF A PILOT LOOKING FORWARD FROM A COCKPIT
10 Claims, 4 Drawing Figs.
[52] U.S. Cl. .................................................. 244/129,
 244/1; 89/28
[51] Int. Cl. ..................................................... B64d 47/00
[50] Field of Search ............................................ 244/1, 117,
 119, 129; 73/431, 432; 180/90; 248/27; 296/70;
 317/99, 119; 340/27; 343/107, 108; 200/167;
 89/28

[56] References Cited
UNITED STATES PATENTS
2,454,272 11/1948 Case .............................. 244/129
3,283,088 11/1966 Scow et al.

Primary Examiner—Milton Buchler
Assistant Examiner—Steven W. Weinrieb
Attorney—Beveridge & De Grandi ABSTRACT: There is described a modified cockpit arrangement by which a pilot of a tactical bombing or fighter aircraft sees both his visual aiming point along the fuselage and ordnance firing switches contiguous to, and immediately subjacent to, his line of sight, wherein any operation of the several controls is peripherally seen for identification since it is within a few degrees of the line of sight corresponding to maximum visual acuity. Operation of master switching and subordinate switching is guided by feel, by providing guide means for his fingers within this line of vision as additional assurance as to which switches are being controlled by his several fingers at any instant.

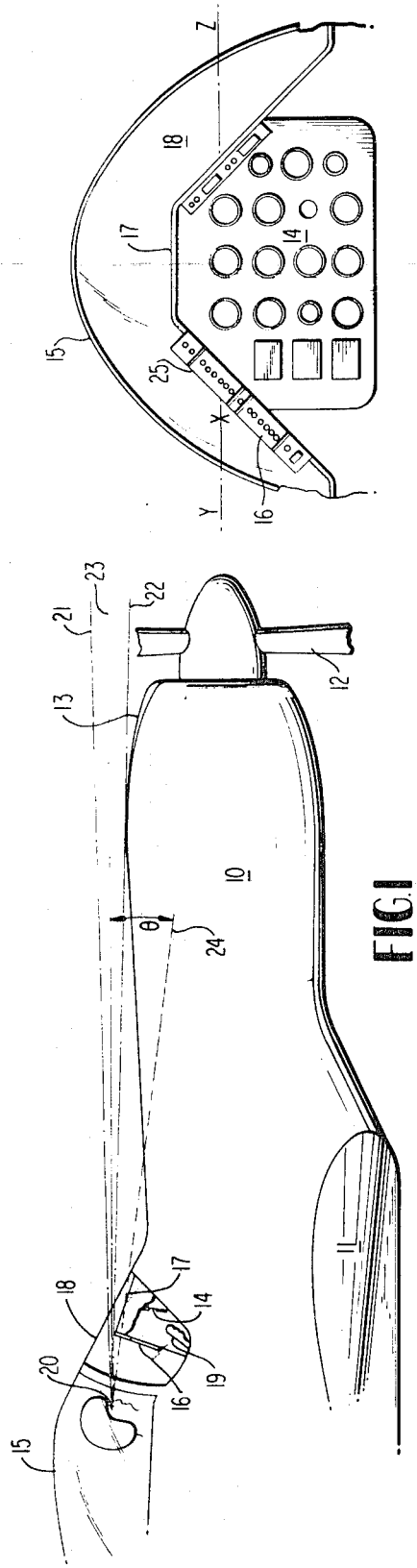
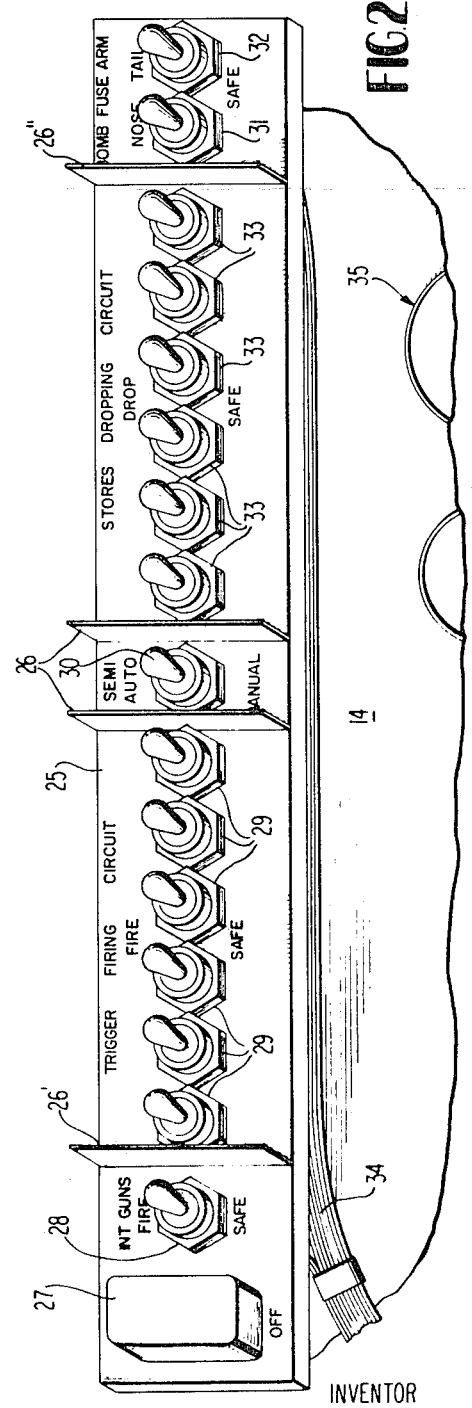

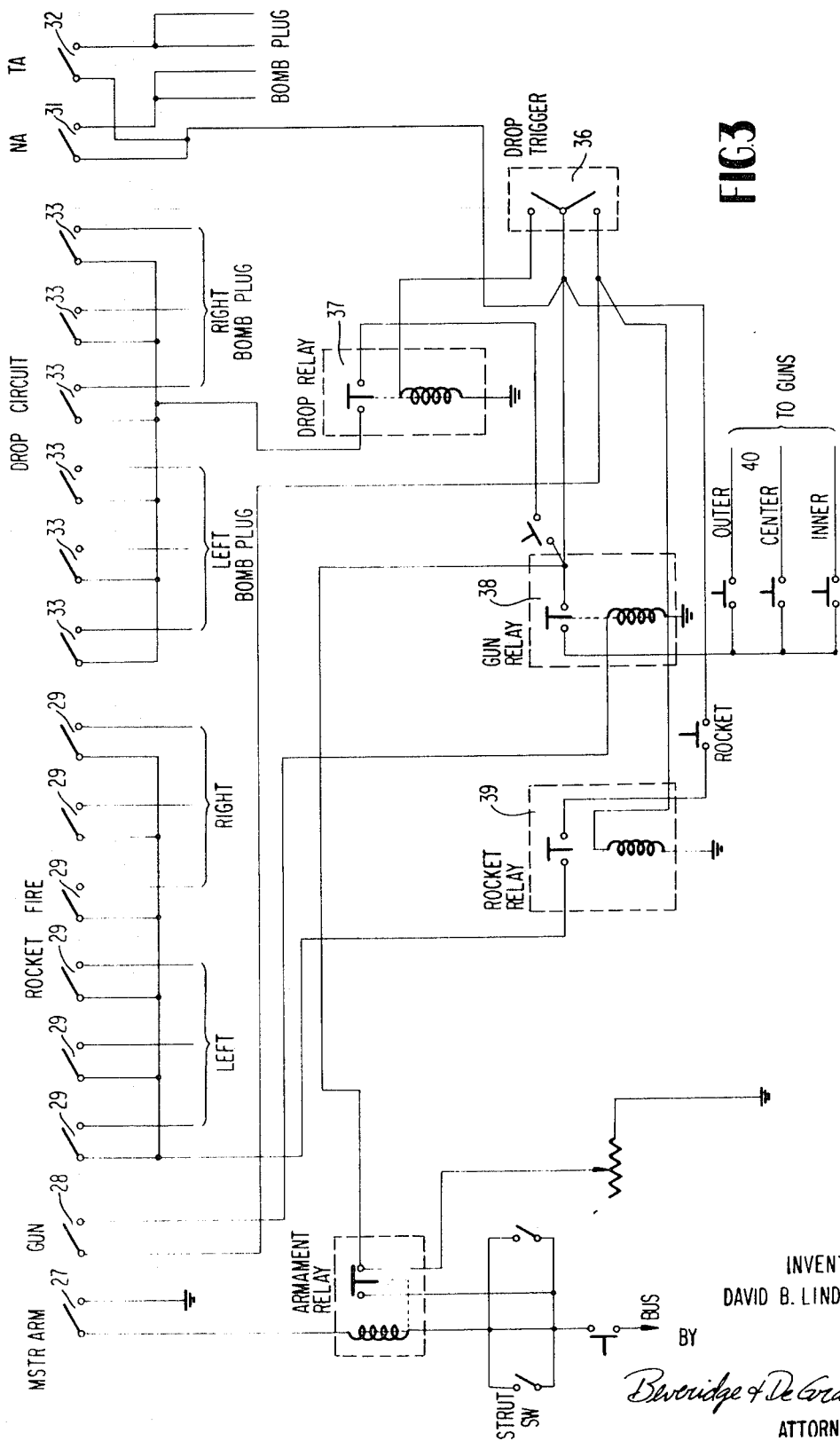

ORDNANCE ACTUATION CONTROLS WITHIN THE RANGE OF VISION OF A PILOT LOOKING FORWARD FROM A COCKPIT

Tactical bombing aircraft and aircraft for close ground support ideally require continuous guidance observation by the pilot and simultaneous checking of the several control switches and firing switches before release of bombs or firing of machine guns or rockets. This ideal combination has not been previously achieved. In an aircraft having a number of rocket or bombing switches and a number of gun switches it has ordinarily been necessary for the pilot to take his eyes from the target in order to place his fingers which control the switches either for arming or firing the item of ordinance immediately desired. As many as 15 switches are controlled by the fingers of one hand while the other hand operates the control lever or stick of the airplane. In tactical flying conditions and in close ground support it is often most essential that the pilot keep his eyes continuously on the target, so that he is unable to watch the ordnance switches operated. It has accordingly been noted that the wrong button or switch is operated or, being unable to find the desired switch during a particular instance the target opportunity is missed, and his opponent may get the first shot or the target may be lost. This has frequently resulted in loss of the pilot and his plane.

It is accordingly an object of the invention to provide means for presenting an arming switch panel adjacent the line of maximum vision while the pilot observes the target along the top of the fuselage forward of his cockpit. A further object is to provide an ordnance control panel adapted to permit the pilot to determine which of several switches in a panel he is contacting with fingers of one hand while closely observing a target without shifting his attention from the target to the switch panel in order to properly place the fingers for the successive rapid release of bombs, rockets or machine gun fire.

Other objects and advantages of the invention will be appreciated as the description proceeds in connection with the drawings, in which:

FIG. 1 is a diagrammatic sketch of a cockpit showing the arrangement of a switch panel in relation to the target line of sight in accordance with this invention;

FIG. 1a is a forward view of the instrument and switch panels as in FIG. 1;

FIG. 2 is a detailed switch panel arranged according to this invention; and

FIG. 3 is a circuit diagram of an ordnance control system for use in the airplane of FIG. 1.

Proceeding now to a more detailed description of the invention the forward portion of an airplane is generally shown at 10 with the wings 11 indicated generally. Propeller 12 is indicated at the nose of the airplane, as is conventional, in a single engine propeller-driven tactical aircraft wherein the motor is surrounded by a linearly cylindrical cowling 13 extending back to the instrument panel 14 in a conventional arrangement for a single seated fighter airplane.

The pilot's compartment or cockpit is generally enclosed at the upper surface by a canopy 15 joining with the sides of the aircraft above wing 11 and with the cowling 13 as by windshield 18 through which the observation by the pilot normally occurs. In accordance with this invention a switch panel shown generally at 16 is arranged on the rear edge of a cockpit cowling 17 subjacent to the transparent windshield 18 and aft of the instrument panel 14. By reference to FIG. 1 and FIG. 1a it will be seen that the pilot's line of vision when observing a target area is represented by lines 21, 22 and 23 of which line 22 is a straight line drawn from the pilot's eye past the switch panel 16, and line 21 represents a line passing to the far side of the target area, line 23 designating the centerline to the target. In this manner a target seen at X just over the top and to the left of a switch panel is seen along the line of sight differing from the line of sight to the switch panel by only a very few degrees, such as 2° to 10°. Preferably the beam of light represented as corresponding to the line of vision of the pilot when observing the target is of comparable breadth to the beam of light represented by observation of the switch panel which lies immediately beneath line 22. If the centerline of the target observation beam at 23 is taken with respect to the center line for the switch panel at 24 an angle $\theta$ is designated corresponding to this spread of 2° to 10°. It may be noted that the conventional aircraft cockpit has a sloped cowling at the sides as illustrated in FIG. 1a so that the pilot's observation of his target lying below the plane of flight is made possible by leaning either to the left or the right and looking along the side of the cowling. The angle $\theta$ may thus be taken in a plane perpendicular to the lineal extent of the switch panel 16 as the pilot is observing his aim on point X on the plane Y–Z, which may be substantially below his line of flight.

FIG. 2 illustrates a switch panel in detail in which the base of the panel 25 is mounted perpendicularly to the longitudinal center of the plane and perpendicularly to the cowling 17 along the edge of which it may be mounted. This cowling forms a partial cover over the instrument panel shown at 14 and may extend something like one-third of the distance from the instrument panel to the pilot's eye so as to be within easy reach of one hand by which the switches are operated, in this case the left-hand. The switch panel preferably has finger guiding barriers 26, 26', and 26'' so that the pilot who is occupied in close observation of a target such as another fighter plane, can tell by feel which set of switches are contacted by his fingers. Barrier 26 conveniently separates stores-dropping circuits from ordnance-firing circuits and additionally may enclose the switch controlling whether firing is "manual" or "semiautomatic." Barrier 26' conveniently separates a gun-arming switch from bomb-firing switches and barrier 26'' separates bomb-fuse-arming switches from the actuating switches for the stores-dropping circuit. A master-arming switch 27 may cut off control to all other switches on the panel. Twenty-eight represents the gun-arming switch and 29 represents the rocket or bomb-dropping switches. The automatic-manual control switch 30 is shown at the center of the panel. Nose and tail arming switches 31 and 32 may connect to other guns or armament, being shown beyond barrier 26'' while switches 33 represent the individual stores-dropping circuit switches each of which is actuatable to ready for drop the particular selected item.

FIG. 3 illustrates by a schematic wiring diagram the switching connections operated by the switch panel previously described. A switch 36 may be located, for example, on the end of the aircraft control stick and comprises two normally open switches shown as "drop" and "trigger" of which the drop switch when closed operates a "drop" relay to supply power to one side of each of the switches in the drop circuit at 33. The "trigger" switch portion of 36 is the means of instant firing for the gun armament whenever switch 28 is closed, provided master arming switch 27 is previously closed. Closing of switch 27 normally operates an armament relay which makes contact between a power supply and the center pole of "drop-trigger" switch 36. Gun relay 38 and rocket relay 39 may also be included as in FIG. 3 when switches 29 are employed for the firing of rockets. In this manner the firing circuits to rocket guns and bombs may be controlled by conventional circuitry not forming a part of the present invention. For example, switches 40 may be suitably interconnected between contacts with relay 38 and the guns to be actuated through switches associated with the mountings for the guns. Switch 41 similarly may connect through the contacts of relay 39 which energizes each of switches 29 to make connection through the separate rockets to the system ground and thence back to the power supply.

Having thus described the operation of the switches it will be evident that the separate items of ordnance are under arming control by the fingers of the left hand, when switch panel 16 is on the left side of the cockpit, and that the pilot can immediately determine from the feel of barriers 26, 26' and 26'' whether his hand is in control of the rocket or the dropping circuits or the gun arming circuit 28. He can further tell which of six or more circuits the fingers of his left hand are contact- ing by feeling the adjacent barrier. By placement of the switch panel he also sees peripherally the hand placement at least as to which group of like buttons is beneath the firing fingers.

His right hand is normally employed in the handling of the control stick and has on the end thereof actuating switches for instant drop or gun triggering such that he is in complete control of the ordnance item operated without closely observing the switch panel. However, some time is saved and a greater assurance of correct operation is provided to the embattled pilot by permitting him to see simultaneously his target and the switch which he is operating with the left hand made possible by the described arrangement of the switch panel within easy reach and within the peripheral vision area when he is observing a target immediately ahead of his airplane. These two features in combination are found to greatly improve the certainty of correct operation, contributing both to the peace of mind and deliberate action of the pilot and to the preservation of pilot and plane under conditions of extreme stress.

This invention can be practiced otherwise than as specifically disclosed, the illustration and description being illustrative of the principles involved.

I claim:

1. In an aircraft having an enclosed pilot cockpit with a view forward along the fuselage wherein a pilot cockpit is substantially below the fuselage top except for a viewing space therealong, having navigation instruments displayed across the front of the cockpit and a control stick provided for piloting the aircraft having thereon at least one ordnance trigger, the improvement comprising:

a cowling forming a continuation of the fuselage extending aft into the cockpit space from said instrument panel;

an arrangement of arming switch controls individual to a number of ordnance items to be actuated by the pilot in accordance with a visual sighting along said fuselage;

said controls comprising a row of switches arranged along the after edge of said cowling along one side of said cockpit in approximate alignment with a direction of sighting along said fuselage line forward from the pilot;

a plurality of ordnance devices connected for firing in response to operation of said trigger and connected to an actuating power supply by way of one switch for each of said devices, respectively, whereby said device may be fired or actuated; and said array of switches being in substantially contiguous alignment with the line of sighting in the forward direction along the fuselage and within the near peripheral vision range of the pilot such that the several fingers of the pilot's hand in controlling the arming switches remain within the field of vision of the pilot as he observes a target.

2. A cockpit arrangement according to claim 1, said arming switches comprising a plurality of bomb-release arming switches.

3. The cockpit arrangement according to claim 1, said switches comprising arming switches for a plurality of machine guns attached to said aircraft for forward firing in which each said arming switch controls the arming of one said machine gun for actuation according to said trigger.

4. A cockpit arrangement according to claim 1, wherein said plurality of switches comprise one switch for each of a plurality of bombs carried by the aircraft and one switch for each of the plurality of machine guns forwardly directed and supported in alignment with said fuselage.

5. A cockpit arrangement according to claim 1, including a plurality of switches individual to a plurality of ordnance devices and a master arming switch connecting each other said switch to a power supply and to said ordnance device when said trigger is operated, said master arming switch thereby being in series with said trigger and said individual arming switch.

6. A cockpit arrangement according to claim 5, including a plurality of arming switches individual to a plurality of bombs mounted on the aircraft and a plurality of machine gun arming switches individual to a plurality of machine guns directed forwardly through said fuselage, whereby said pilot may observe the position of his hand controlling the arming switches at the same time keeping the switches in sight while observing a target forward from the aircraft.

7. A cockpit arrangement according to claim 1, wherein said array of switches comprises a plurality of finger-operated switches arranged in a linear array along the left side of said cowling whereby the individual switches are within easy reach of the pilot for finger operation by the left hand as the right hand controls said trigger.

8. An arrangement according to claim 7, wherein a master switch is located at one end of said array and in successive linear positions therefrom a plurality of bomb arming switches and a plurality of machine gun arming switches are arranged in substantial linear array parallel with the plane tangent to the fuselage surface along the line directly forward from the point of observation of a pilot seated in the cockpit.

9. A cockpit arrangement according to claim 9, said array of switches including a set of bomb arming switches connected in series to a first trigger on said airplane control stick and a second set of machine gun arming switches connected in series with the second trigger switch on the control stick of said aircraft.

10. In a tactical aircraft including a fuselage having a substantially linear sighting line along an upper surface thereof aligned substantially with a target toward which the airplane is pointing and having a cockpit arranged for the seating of a pilot with his head slightly above the fuselage level for sighting along said line, and further having an instrument panel displayed across a forward portion of a cockpit having cowling on the upper and one lateral side thereof extending aft from the fuselage surface a substantial distance beyond the instrument panel to provide a light shield, the improvement comprising:

a set of ordnance arming switches arranged in a linear pattern along one lateral edge of said cowling at the rear edge thereof in facing relation to the pilot seated in the cockpit;

a first group of switches in said array adjacently arranged for individual arming of ordnance devices of one type each being connected for the control of arming of a said ordnance device;

a trigger switch connecting each said arming switch to a power supply and an actuator for said ordnance device individual thereto;

a master arming switch arranged at one end of said array of switches for ordnance devices of one kind, being in series with said individual arming switches and said trigger for further control of arming of said ordnance devices; and sensible barrier means extending substantially from said array in the direction of the pilot and having physical dimensions to guide the fingers of the pilot for locating by feel said master arming switch and each of said individual arming switches.